US010625562B2

(12) United States Patent
Oh et al.

(10) Patent No.: US 10,625,562 B2
(45) Date of Patent: Apr. 21, 2020

(54) COOLING WATER HEATING APPARATUS FOR ELECTRIC VEHICLE

(71) Applicants: HYUNDAI MOTOR COMPANY, Seoul (KR); KIA MOTORS CORPORATION, Seoul (KR); DOOWON CLIMATE CONTROL CO., LTD., Asan-si, Chungcheongnam-do (KR)

(72) Inventors: Man Ju Oh, Yongin-si (KR); Sang Shin Lee, Suwon-si (KR); So La Chung, Seoul (KR); Jae Woong Kim, Hwaseong-si (KR); So Yoon Park, Suwon-si (KR); Jae Woo Park, Ansan-si (KR); Du Youl Choi, Asan-si (KR)

(73) Assignees: Hyundai Motor Company, Seoul (KR); Kia Motors Corporation, Seoul (KR); Doowon Climate Control Co., Ltd., Anan-si, Chungcheongnam-do (KR)

( * ) Notice: Subject to any disclaimer, the term of this patent is extended or adjusted under 35 U.S.C. 154(b) by 240 days.

(21) Appl. No.: 15/824,778

(22) Filed: Nov. 28, 2017

(65) Prior Publication Data
US 2019/0061463 A1     Feb. 28, 2019

(30) Foreign Application Priority Data
Aug. 31, 2017    (KR) ........................ 10-2017-0110913

(51) Int. Cl.
*H05B 3/82*     (2006.01)
*F24H 9/00*     (2006.01)
(Continued)

(52) U.S. Cl.
CPC ....... *B60H 1/00271* (2013.01); *B60H 1/2221* (2013.01); *F01P 3/20* (2013.01);
(Continued)

(58) Field of Classification Search
None
See application file for complete search history.

(56) References Cited

U.S. PATENT DOCUMENTS

2,266,216 A * 12/1941 Kimberlin ............... F02N 19/10
                                                                      392/489
2,440,610 A * 4/1948 Kimberlin ............... F02N 19/10
                                                                      219/208
(Continued)

*Primary Examiner* — Thor S Campbell
(74) *Attorney, Agent, or Firm* — Morgan, Lewis & Bockius LLP (57) ABSTRACT

A cooling water heating apparatus includes: a housing having an inlet through which cooling water flows in at a first side and an outlet through which cooling water flows out at a second side; a sheath heater housed in the housing and electrically connected to an outside through an electric circuit to heat the cooling water in the housing; and an overheat preventing device housed in the housing to be submerged under the cooling water in an upper side of the housing in a gravity direction, the overheat preventing device having a positive temperature coefficient (PTC) device connected in series to the electric circuit of the sheath heater to allow the PTC device to control energization of the sheath heater.

10 Claims, 6 Drawing Sheets

(51) Int. Cl.
*F24H 1/00* (2006.01)
*F24H 1/20* (2006.01)
*H05B 1/02* (2006.01)
*H05B 3/42* (2006.01)
*B60H 1/00* (2006.01)
*F01P 7/14* (2006.01)
*F01P 3/20* (2006.01)
*F24H 9/20* (2006.01)
*B60H 1/22* (2006.01)

(52) U.S. Cl.
CPC ............... *F01P 7/14* (2013.01); *F24H 1/009* (2013.01); *F24H 1/202* (2013.01); *F24H 9/0021* (2013.01); *F24H 9/2014* (2013.01); *F24H 9/2028* (2013.01); *H05B 1/023* (2013.01); *H05B 3/42* (2013.01); *H05B 3/82* (2013.01); *B60H 2001/2271* (2013.01); *F01P 2060/18* (2013.01); *F24H 9/0005* (2013.01); *H05B 2203/021* (2013.01)

(56) References Cited

U.S. PATENT DOCUMENTS

| | | | | | |
|---|---|---|---|---|---|
| 2,574,929 | A | * | 11/1951 | McClain | F02N 19/10 392/489 |
| 3,218,433 | A | * | 11/1965 | Steenbergen | F02N 19/10 219/208 |
| 3,617,700 | A | * | 11/1971 | Hooper | F24H 1/202 392/487 |
| 3,626,148 | A | * | 12/1971 | Woytowich | F02N 19/10 219/208 |
| 3,835,434 | A | * | 9/1974 | Kahn | H01C 1/1406 338/22 R |
| 3,969,605 | A | * | 7/1976 | Danell | F02N 19/10 219/208 |
| 4,086,467 | A | * | 4/1978 | Grant | H05B 3/141 219/505 |
| 4,091,267 | A | * | 5/1978 | Grant | H05B 3/06 219/505 |
| 4,104,509 | A | * | 8/1978 | Van Bokestal | H01C 1/02 219/544 |
| 4,177,375 | A | * | 12/1979 | Meixner | H05B 3/141 219/439 |
| 4,208,570 | A | * | 6/1980 | Rynard | F02N 19/10 123/142.5 E |
| 4,230,935 | A | * | 10/1980 | Meixner | H01C 7/022 219/523 |
| 4,331,861 | A | * | 5/1982 | Meixner | H01C 1/1406 219/505 |
| 4,358,665 | A | * | 11/1982 | Owen | F24H 1/102 219/523 |
| 4,358,667 | A | * | 11/1982 | Johnson | H05B 3/82 219/508 |
| 4,371,778 | A | * | 2/1983 | Meixner | H05B 3/141 138/33 |
| 4,395,623 | A | * | 7/1983 | Shimada | H05B 3/141 219/505 |
| 4,689,878 | A | * | 9/1987 | Beauregard | H05B 3/14 219/505 |
| 4,697,069 | A | * | 9/1987 | Bleckmann | H05B 3/48 219/510 |
| 4,770,134 | A | * | 9/1988 | Foreman | F02N 19/10 123/142.5 R |
| 4,808,793 | A | * | 2/1989 | Hurko | F24H 1/102 392/480 |
| 4,822,980 | A | * | 4/1989 | Carbone | H05B 3/141 219/205 |
| 4,835,370 | A | * | 5/1989 | Van Bokestal | H05B 3/14 219/504 |
| 4,900,897 | A | * | 2/1990 | Cunningham | H05B 3/48 219/523 |
| 5,408,960 | A | * | 4/1995 | Woytowich | B60L 1/02 123/142.5 E |
| 5,414,241 | A | * | 5/1995 | Ohashi | A47G 1/02 219/219 |
| 5,720,556 | A | * | 2/1998 | Krellner | G01K 1/16 338/28 |
| 5,866,882 | A | * | 2/1999 | Saur | H05B 3/48 219/541 |
| 6,820,502 | B2 | | 11/2004 | Jiang et al. | |
| 9,127,762 | B2 | * | 9/2015 | Oh | F16H 57/0413 |
| 10,283,293 | B2 | * | 5/2019 | Ullermann | H01H 37/04 |
| 2007/0272525 | A1 | * | 11/2007 | Suzuki | H01H 81/02 200/16 R |
| 2008/0107964 | A1 | * | 5/2008 | Choi | H01M 2/0404 429/174 |
| 2008/0175572 | A1 | * | 7/2008 | Barnes | H05B 3/48 392/497 |

* cited by examiner

COOLING WATER HEATING APPARATUS FOR ELECTRIC VEHICLE

CROSS REFERENCE TO RELATED APPLICATION

The present application claims the benefit of priority to Korean Patent Application No. 10-2017-0110913, filed Aug. 31, 2017, the entire content of which is incorporated herein for all purposes by this reference.

TECHNICAL FIELD

The present disclosure relates to a cooling water heating apparatus for an electric vehicle. More particularly, the present disclosure relates to a cooling water heating apparatus for an electric vehicle which has a sheath heater to heat the cooling water, and which is capable of preventing the sheath heater from overheating and breaking down due to leaking of the cooling water.

BACKGROUND

Recently, in terms of electric vehicles, there are needs for the implementation of environmental-friendly technologies and the solution of problems such as energy depletion and the like. Since the electric vehicles have advantages in that they operate by using a motor that outputs power by receiving electricity from a battery, no carbon dioxide is emitted, noise is very small, and energy efficiency of the motor is higher than the energy efficiency of an engine. Accordingly, electric vehicles are spotlighted as environmental-friendly vehicles.

However, unlike a conventional internal combustion engine in which cooling water is heated by using a heat source generated by an engine, there is a disadvantage in that an electric vehicle cannot heat the cooling water by using heat generated from the engine because there is no separate engine.

Therefore, a separate apparatus for heating the cooling water must be provided. A temperature sensor or a controller is typically applied to a circuit part to control the temperature of the sheath heater and to prevent it from overheating. However, when the controller or the sensor of the circuit part breaks down, it is impossible to control energization of the sheath heater, resulting in a disadvantage that the sheath heater overheats and breaks down.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a cooling water heating apparatus for electric vehicles that is capable of effectively preventing a sheath heater from overheating without applying a temperature sensor directly to a circuit unit.

According to one aspect of the present disclosure, a cooling water heating apparatus includes: a housing having an inlet through which cooling water flows in at a first side and an outlet through which cooling water flows out at a second side; a sheath heater housed in the housing and electrically connected to an outside through an electric circuit to heat the cooling water in the housing; and an overheat preventing device housed in the housing to be submerged in the cooling water in an upper side of the housing in a gravity direction, the overheat preventing device having a positive temperature coefficient (PTC) device connected in series to the electric circuit of the sheath heater to allow the PTC device to control energization of the sheath heater.

The PTC device of the overheat preventing device may be provided with an anode terminal and a cathode terminal on opposite sides of the PTC device, the anode terminal and the cathode terminal may be installed through an upper surface of the housing, and an electric wire portion connected to the electric circuit may be provided at a region of the anode terminal and the cathode terminal that is located outside the housing to prevent a short circuit due to the cooling water when the overheat preventing device is broken.

The overheat preventing device may include a body having a receiving space formed therein; a PTC device inserted in the receiving space; an anode terminal and a cathode terminal closely provided respectively to opposite sides of the PTC device; an insulator surrounding the PTC device, the anode terminal, and the cathode terminal from the outside; and a sensor provided on an outer circumferential surface of the body to detect an amount of heat generated from the PTC device.

The housing may be integrally formed with the body by bending a portion of the upper surface of the housing into the housing and forming the receiving space provided therein.

The insulator may be configured to surround portions of the cathode terminal, the PTC device, and the anode terminal that are located to face the housing.

An elastic member may be provided between the body and the insulator to press the cathode terminal and the anode terminal against the PTC device so that the cathode terminal and the anode terminal may come into surface contact with the PTC device.

Any one of the cathode terminal and the anode terminal may extend in a vertical direction of the body in which an end portion thereof is bent along a bottom surface of the body and then extends to provide an extended portion to allow the PTC device to be positioned on the extended portion, and the other one of the anode terminal or the cathode terminal may extend in a vertical direction of the body in which an end portion thereof is bent along an upper surface of the PTC device and then extends to provide a bent portion.

The body may be provided with a lid for sealing the body, and an elastic member may be provided between the lid and an electrode to press the anode terminal, the cathode terminal, and the PTC device against the body, thereby to allow the anode terminal and the cathode terminal to be closely contact with the PTC device.

The outlet may be located higher than the inlet so that the cooling water heated by the sheath heater flows out of the housing.

An upper surface of the overheat preventing device may be provided to be located higher than an upper surface of the sheath heater, and an amount of heat generated from the sheath heater varies in accordance with a water level of the cooling water in the housing, so the overheat preventing device may prevent the sheath heater from overheating.

An upper surface of the overheat preventing device and an upper surface of the sheath heater may be provided below an upper surface of the housing in the gravity direction, and an amount of heat generated from the sheath heater may vary in accordance with a water level of the cooling water in the housing, so the overheat preventing device may prevent the sheath heater from overheating.

According to the cooling water heating apparatus for electric vehicles having the structure described above, when the cooling water is heated by the sheath heater, the sheath heater may be prevented from overheating by the overheat preventing device to prevent vapor from generating and therefore to prevent components from breaking. In addition, there are advantages in that it is possible to set a normal water level different for each vehicle type without a separate component by setting the sensor of the overheat preventing device at a necessary position, and the cooling water heating apparatus for electric vehicles can be safely controlled without a separate control device by using a PTC device stable for controlling the temperature.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinafter, a cooling water heating apparatus for an electric vehicle according to an exemplary embodiment of the present disclosure will be described with reference to the accompanying drawings.

Figure 1:
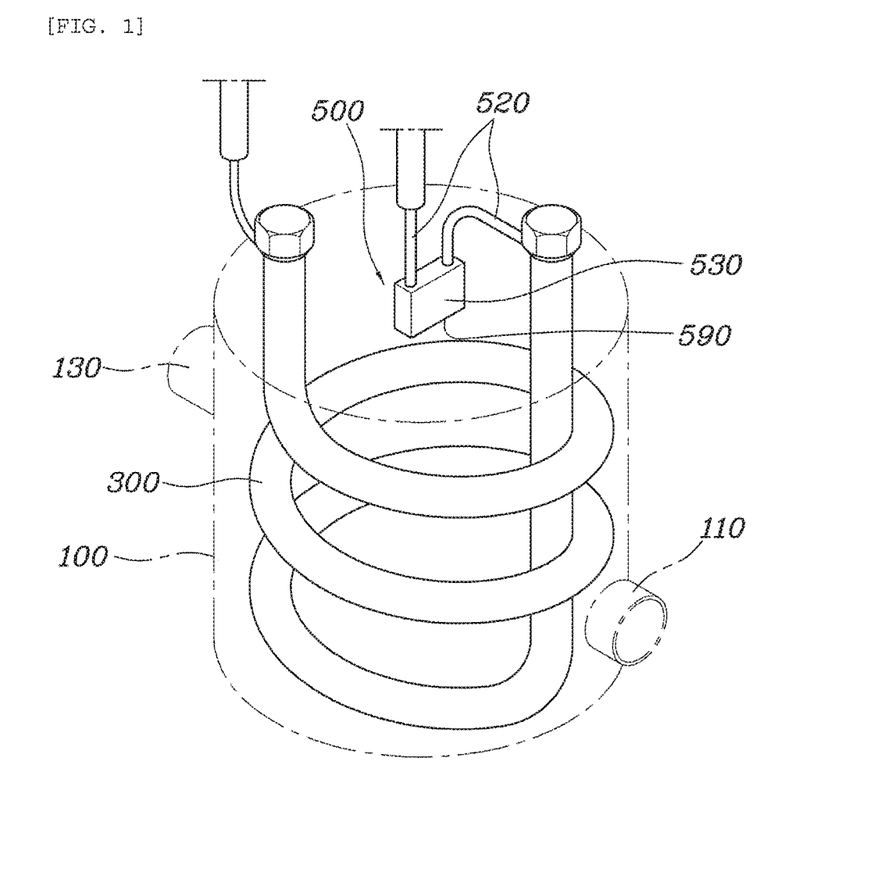
FIG. 1 is a view showing a cooling water heating apparatus for an electric vehicle according to an exemplary embodiment of the present disclosure.
Figure 2:
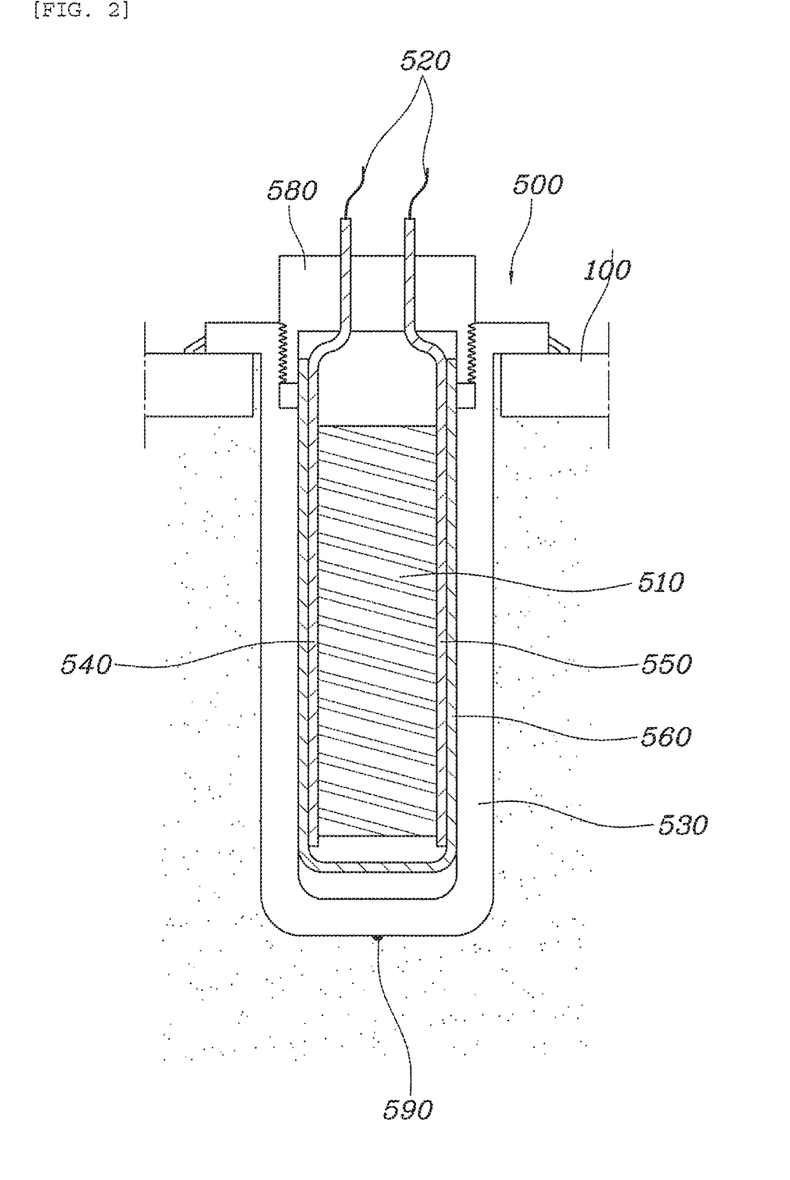
FIG. 2 is a sectional view of a heating prevention means of FIG. 1.
Figure 3:
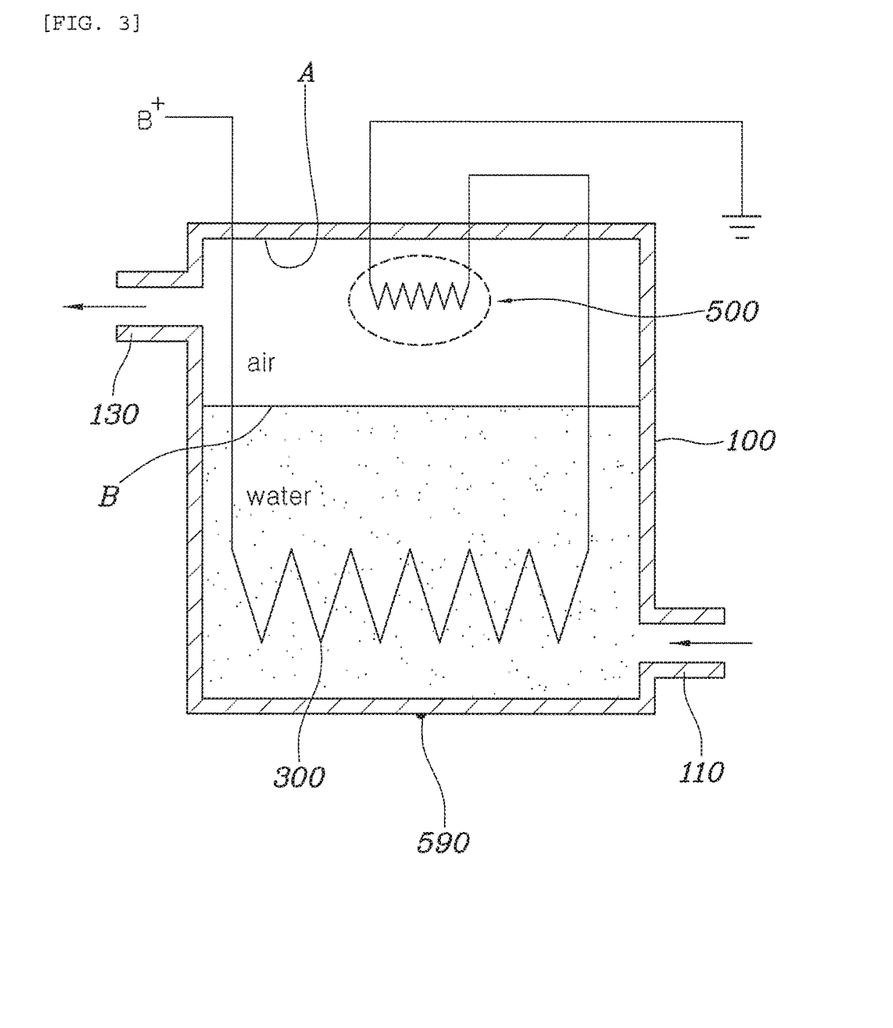
FIG. 3 is a view illustrating an operation of a cooling water heating apparatus for an electric vehicle according to the present disclosure.
Figure 4:
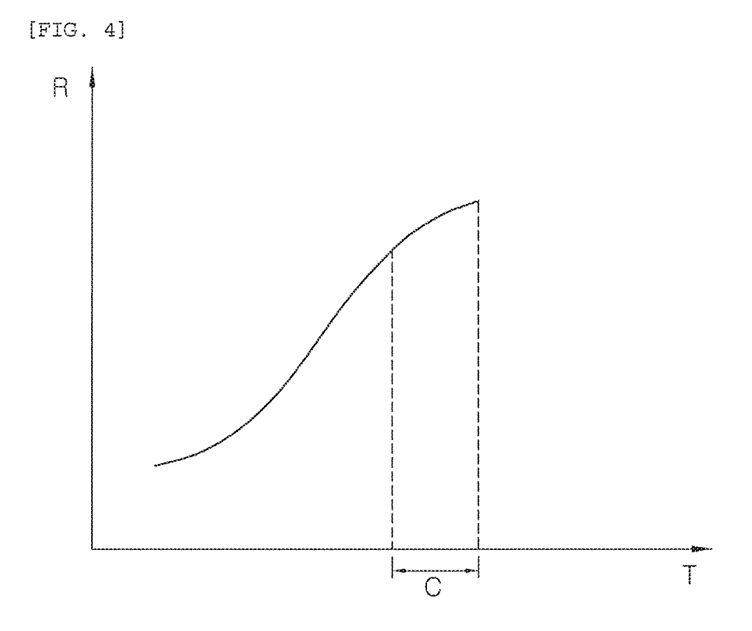
FIG. 4 is a view showing a relationship between resistance and temperature.
Figure 5:
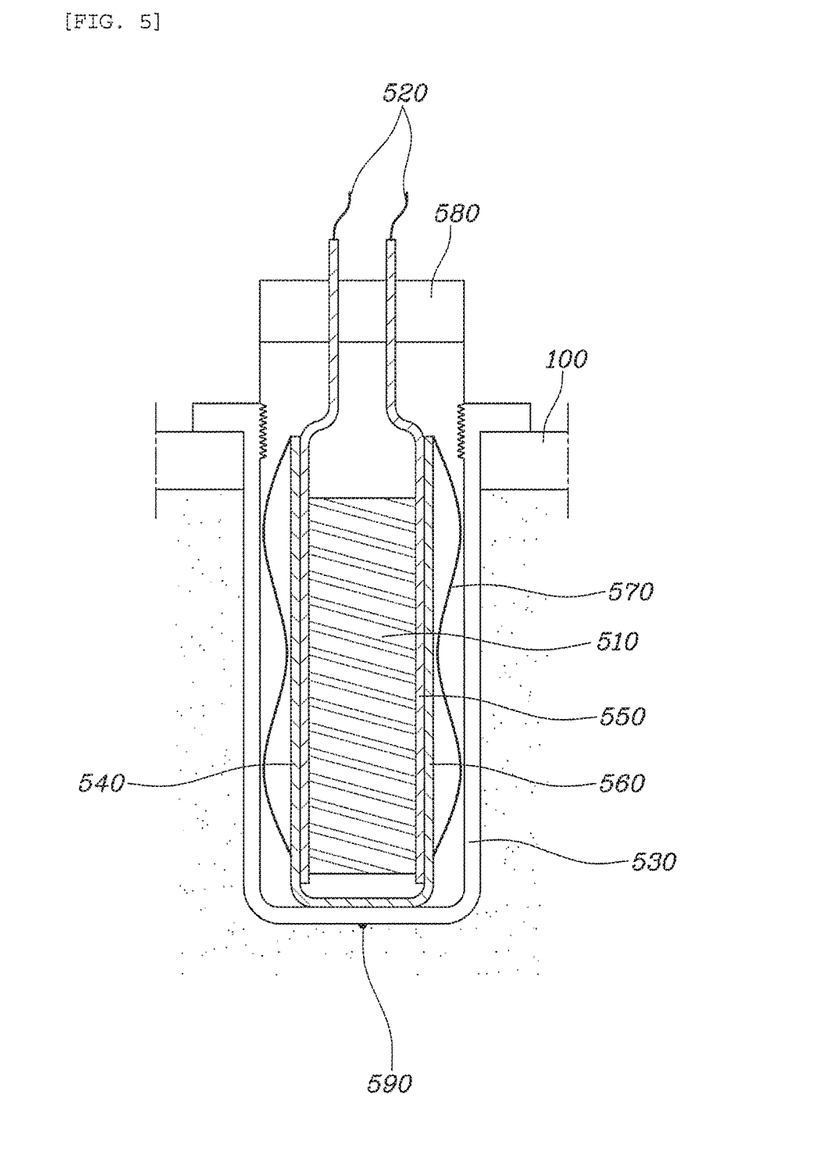
FIG. 5 and FIG. 6 are views showing a cooling water heating apparatus for an electric vehicle according to another exemplary embodiment of the present disclosure.
Figure 6:
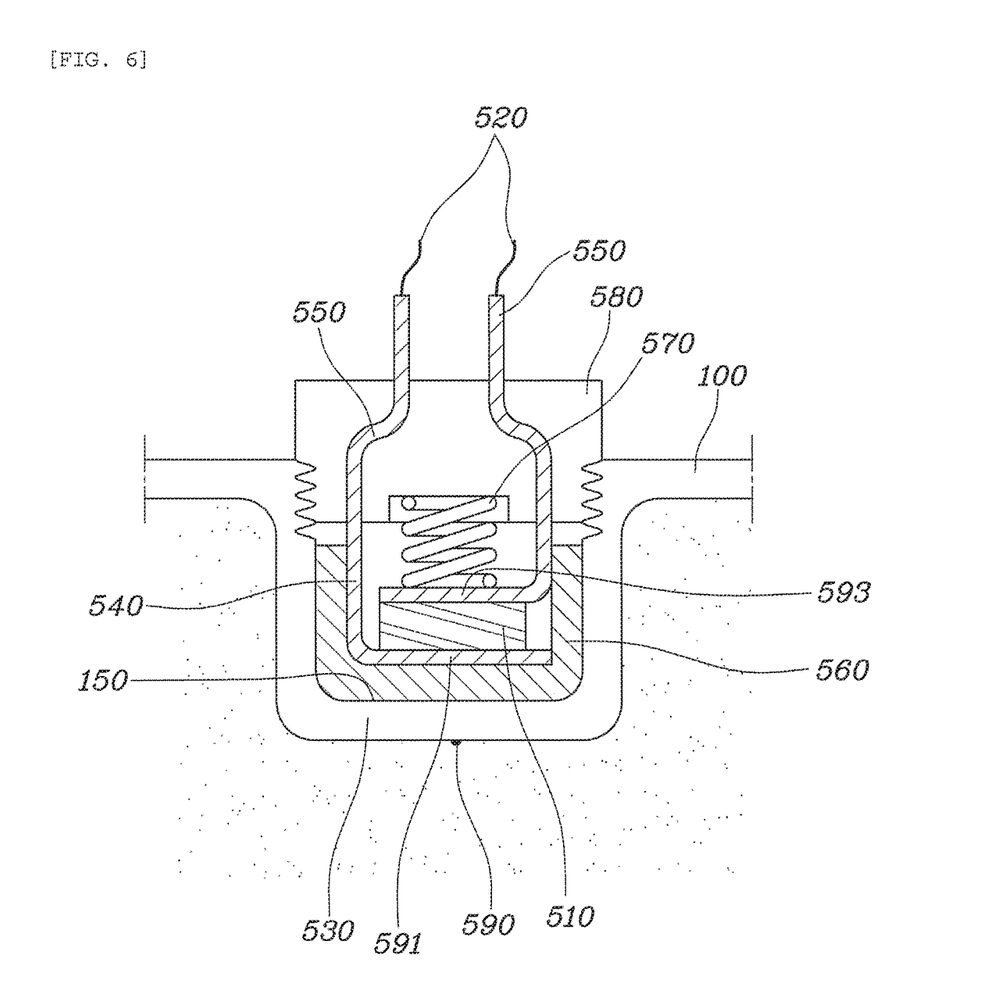

FIG. 1 is a cross-sectional view of a cooling water heating preventing device for an electric vehicle according to one exemplary embodiment of the present disclosure, FIG. 2 is a sectional view of the heating prevention means of FIG. 1, FIG. 3 is a view for explaining an operation of a cooling water heating apparatus for an electric vehicle according to the present disclosure, FIG. 4 is a view showing a relationship between resistance and temperature, and FIG. 5 and FIG. 6 are views showing a cooling water heating apparatus for an electric vehicle according to another exemplary embodiment of the present disclosure respectively.

The cooling water heating apparatus for an electric vehicle according to the exemplary embodiment of the present disclosure includes: a housing 100 having an inlet 110 through which cooling water flows in at a first side and an outlet 130 through which cooling water flows out at a second side; a sheath heater 300 housed in the housing 100 and electrically connected to the outside through an electric circuit to heat the cooling water in the housing 100; and a overheat preventing device 500 housed in the housing 100 to be submerged in the cooling water on an upper side of the housing in a gravity direction, and has a positive temperature coefficient (PTC) device 510 connected in series to the electric circuit of the sheath heater 300 to allow the PTC device 510 to control an energization of the sheath heater 300.

As shown in FIG. 1, the housing 100 has the inlet 110 through which cooling water flows in at a first side and the outlet 130 through which the cooling water flows out at a second side, and the cooling water flowing in through the inlet 110 is heated in the housing 100 by the sheath heater 300, and then flows out to the outlet 130. Particularly, the outlet 130 is positioned higher than the inlet 110, so that the cooling water heated by the sheath heater 300 is upwardly moved by convection due to the temperature difference and therefore flows out to the outside of the housing 100. In the present specification, the shape of the housing 100 is shown and described as a cylindrical shape by way of example, but the present disclosure is not limited thereto.

The sheath heater 300 is housed in the housing 100 and is electrically connected to the outside through an electric circuit to heat the cooling water in the housing 100. As shown in FIG. 1, the sheath heater 300 may be shaped such that the area thereof contacting the cooling water may be as large as possible when the sheath heater 300 is housed in the housing 100, but is not limited thereto.

The overheat preventing device 500 will be described in more detail. The overheat preventing device 500 includes a body 530 having a receiving space therein; a PTC device 510 inserted in the receiving space, an anode terminal 550 and a cathode terminal 540 tightly attached to both sides of the PTC device 510; an insulator 560 surrounding the PTC device 510, the anode terminal 550, and the cathode terminal 540; and a sensor 590 disposed on an outer circumferential surface of the body 530 to detect an amount of heat generated by the PTC device 510. The body 530 may be separately formed and thus inserted into the housing 100. Further, the body 530 may be integrally formed with the housing 100 by causing a portion of the upper surface of the housing 100 to be bent inwardly of the housing 100, and forming the receiving space 150 provided therein.

The overheat preventing unit 500 includes the PTC device 510 housed in the housing 100 and connected in series to the electric circuit of the sheath heater 300. The sensor 590 is provided on the outer circumferential surface of the overheat preventing device 500 to detect the amount of heat generated from the PTC device 510. When the PTC device 510 is electrically connected to the sensor 590 and then discharges the heat, the sensor 590 senses an amount of heat discharged at this time. Therefore, the sensor 590 may be disposed on the outer circumferential surface of the body 530, and particularly on the lower side in a direction of gravity in order to detect the minimum water level that can be detected by the overheat preventing device 500. Specifically, the sensor 590 is installed on the lower side of the body 530 in the direction of gravity, rather than other regions, to allow the sensor 590 to be provided on a region based on a minimum water level, whereby it may be confirmed that a leak of cooling water has occurred if a difference in the amount of heat generated by the PTC device 510 is sensed by the sensor 590.

Since the overheat preventing device 500 is always being immersed under the cooling water in the housing 100 at the normal water level, the upper surface of the overheat preventing device 500 is located higher than the upper surface of the sieve heater 300. Otherwise, an electric wire 520 or the terminals may come into contact with the cooling water, possibly resulting in a short circuit. Alternatively, the upper surface of the overheating preventing device 500 and the upper surface of the sheath heater 300 may be installed on the lower side of the housing 100 in the direction of gravity, so that the overheating preventing device 500 may sense the water level of the cooling water in the housing 100, thereby preventing the sheath heater 300 from overheating.

The overheat preventing device 500 controls the energization of the sheath heater 300 by using the resistance characteristic of the PTC device 510 in which the resistance value thereof varies in accordance with temperature. More specifically, as shown in FIG. 4, the PTC device 510 allows the sheath heater 300 to normally be operated in an overheat control section C, but has the infinite resistance value at a section other than the overheat control section C. Therefore, since the current is reduced when the resistance is increased by the formula V=IR, no current flows through the sheath heater 300, thereby preventing the sheath heater 300 from overheating and the components from breaking due to overheating.

Specifically, as shown in FIG. 3, when the cooling water in the housing 100 is at the normal water level A, the overheat preventing device 500 is always set to be submerged in the cooling water. When the overheat preventing device 500 is energized, the heat generated by the PTC device 510 is discharged into the cooling water and the sensor 590 provided in the overheat preventing device 500 senses the amount of heat generated from the PTC device 510. At this time, since the PTC device 510 is also a variable resistor of a predetermined value formed in the electric circuit at a specific temperature interval, the sheath heater 300 operates normally.

However, if a leak of the cooling water occurs in the housing 100 to cause the water level of the cooling water to be lowered as an abnormal water level B, the PTC device 510 is allowed to discharge heat in a state in which the overheat prevention device 500 is exposed to the air without being immersed under the cooling water. Typically, since the heat transfer rate of water is greater than the heat transfer rate of air, the amount of heat generated from the PTC device 510 of the overheat preventing device 500 at the abnormal water level B is lower than the amount of heat generated from the PTC device 510 within the cooling water at the normal water level A. Accordingly, the temperature of the PTC device 510 is gradually increased, and the resistance of the PTC device 510 is increased as the temperature is increased. Since the sheath heater 300 is electrically connected in series to the overheat preventing device 500 and the electric circuit, the energization of the sheath heater 300 is controlled by limiting the current amount of the entire system, thereby preventing the sheath heater from overheating. Therefore, there are advantages in that it is possible to prevent the components from overheating and breaking and durability of the components is increased.

According to a first embodiment of the present disclosure, as shown in FIG. 2, the PTC device 510 of the overheat preventing device 500 has an anode terminal 550 and a cathode terminal 540 provided on both sides thereof, in which the PTC device 510, the anode terminal 550, and the cathode terminal 540 are installed in a longitudinal direction corresponding to the direction of gravity. Particularly, the anode terminal 550 and the cathode terminal 540 are installed through the upper surface of the housing 100, and at a portion of the anode terminal 550 and the cathode terminal 540 that is disposed on the outside of the housing 100, the electric wire 520 electrically connected to the electric circuit is provided. As described above, the electric wire 520 is designed to be located outside of the housing 100, whereby electric leakage may be prevented due to the cooling water when the overheating prevention device 500 is broken. The insulator 560 is formed such that it may surround the portions of the cathode terminal 540, the PTC device 510 and the anode terminal 550 that are located on the housing 100. The body 530 is located outside the insulator 560, and the insulator 560 and the body 530 are in tight contact with each other to allow the anode terminal 550 and the cathode terminal 540 to be in close contact with the PTC device 510, whereby there are advantages in that no noise is generated among the PTC device 510 and the anode terminal 550 and the cathode terminal 540 and the heat of the PTC device 510 is more effectively discharged to the outside.

FIG. 5 shows a second embodiment of the present disclosure. The PTC device 510 of the overheat preventing device 500 has an anode terminal 550 and a cathode terminal 540 provided on both sides thereof, in which the PTC device 510, the cathode terminal 540 and the anode terminal 550 extend in the longitudinal direction corresponding to the direction of gravity. Specifically, the anode terminal 550 and the cathode terminal 540 are provided through the upper surface of the housing 100, and at a portion of the anode terminal 550 and the cathode terminal 540 that is disposed on the outside of the housing 100, an electric wire 520 is electrically connected to the electric circuit. As described above, the electric wire 520 is designed to be located outside of the housing 100, thereby preventing a short circuit due to the cooling water when the overheating prevention device 500 is broken. The insulator 560 is formed to surround the portions of the cathode terminal 540, the PTC device 510, and the anode terminal 550 that are located toward the housing 100. The body 530 is positioned outside the insulator 560 and an elastic member 570 is provided between the body 530 and the insulator 560, so that the anode terminal 540 and the anode terminal 550 are pressed against the PTC element 510 by the elastic member 570 so as to be in a surface contact with each other, whereby there are advantages in that no noise is generated among the PTC element 510 and the anode terminal 550 and the cathode terminal 540 and the PTC element 510 may discharge the heat to the outside more effectively.

FIG. 6 shows a third embodiment of the present disclosure.

The PTC device 510 of the overheat preventing device 500 includes the anode terminal 550 and the cathode terminal 540 on both sides thereof. Any one of the cathode terminal 540 and the anode terminal 550 extends along the vertical direction of the body 530, in which an end portion thereof is bent along the bottom surface of the body 530 and then extends to form an extended portion 591 to allow the PTC device 510 to be positioned above the extended portion 591. The other one of the cathode terminal 540 and the anode terminal 550 extends in the vertical direction of the body 530, in which an end portion thereof is bent along the upper surface of the PTC device 510 and then extends to form a bent portion 593, and the insulator 560 is disposed inside the body 530 to surround the extended portion 591, the PTC device 510, and the remaining terminals. The body 530 is provided with a lid 580 for sealing the body 530 and an elastic member 570 is provided between the lid 580 and an electrode, so that the anode terminal 550, the cathode terminal 540, and the PTC device 510 may be pressed against the body 530 to allow the anode terminal 550 and the cathode terminal 540 to come into a surface contact with the PTC device 510, whereby there are advantages in that no noise is generated among the PTC device 510 and the anode terminal 550 and the cathode terminal 540 and the heat of the PTC device 510 can be more effectively discharged to the outside.

According to the cooling water heating apparatus for an electric vehicle of the present disclosure as described above, there is an advantage in that the components may be prevented from breaking since the overheat preventing device 500 may prevent the sheath heater 300 from overheating and prevent vapor from forming when the cooling water is heated by the sheath heater 300. In addition, there are advantages in that a normal water level can be set differently for each vehicle type without requiring a separate component by allowing the sensor 590 of the overheat preventing device 500 to be set at a required position, and the cooling water heating apparatus for an electric vehicle can be safely controlled without a separate control device by using the PTC device 510 capable of stably controlling the temperature.

Although an exemplary embodiment of the present disclosure has been described for illustrative purposes, those skilled in the art will appreciate that various modifications, additions and substitutions are possible, without departing from the scope and spirit of the invention as disclosed in the accompanying claims.

What is claimed is:
1. A cooling water heating apparatus comprising:
 a housing having an inlet through which cooling water flows in at a first side and an outlet through which cooling water flows out at a second side;
 a sheath heater housed in the housing and electrically connected to an outside through an electric circuit to heat the cooling water in the housing; and
 an overheat preventing device housed in the housing and submerged in the cooling water in an upper side of the housing in a gravity direction, the overheat preventing device having a positive temperature coefficient (PTC) device connected in series to the electric circuit of the sheath heater to allow the PTC device to control energization of the sheath heater,
 wherein the overheat preventing device comprises:
  a body having a receiving space defined therein;
  the PTC device inserted in the receiving space;
  an anode terminal and a cathode terminal closely disposed respectively to opposite sides of the PTC device;
  an insulator surrounding the PTC device, the anode terminal, and the cathode terminal from the outside; and
  a sensor disposed on an outer circumferential surface of the body to detect an amount of heat generated from the PTC device.
2. The cooling water heating apparatus of claim 1, wherein the PTC device of the overheat preventing device has the anode terminal and the cathode terminal on opposite sides of the PTC device,
 the anode terminal and the cathode terminal are installed through an upper surface of the housing, and
 an electric wire connected to the electric circuit is disposed at a region of the anode terminal and the cathode terminal that is located outside the housing to prevent a short circuit which is due to the cooling water when the overheat preventing device is broken.
3. The cooling water heating apparatus of claim 1, wherein the housing integrally includes the body by bending a portion of an upper surface of the housing into the housing and having the receiving space therein.
4. The cooling water heating apparatus of claim 1, wherein the insulator surrounds portions of the cathode terminal, the PTC device, and the anode terminal that are located to face the housing.
5. The cooling water heating apparatus of claim 1, wherein an elastic member is disposed between the body and the insulator to press the cathode terminal and the anode terminal against the PTC device so that the cathode terminal and the anode terminal come into surface contact with the PTC device.
6. The cooling water heating apparatus of claim 1, wherein any one of the cathode terminal and the anode terminal extends in a vertical direction of the body, in which an end portion thereof is bent along a bottom surface of the body, and then extends to provide an extended portion to allow the PTC device to be disposed on the extended portion, and the other one of the anode terminal and the cathode terminal extends in a vertical direction of the body in which an end portion thereof is bent along an upper surface of the PTC device and then extends to provide a bent portion.
7. The cooling water heating apparatus of claim 6, wherein the body includes a lid for sealing the body, and
 an elastic member is disposed between the lid and an electrode to press the anode terminal, the cathode terminal, and the PTC device against the body, so that the anode terminal and the cathode terminal closely contact with the PTC device.
8. The cooling water heating apparatus of claim 1, wherein the outlet is located higher than the inlet so that the cooling water heated by the sheath heater flows out of the housing.
9. The cooling water heating apparatus of claim 1, wherein an upper surface of the overheat preventing device is located higher than an upper surface of the sheath heater, and
 an amount of heat generated from the sheath heater varies in accordance with a water level of the cooling water in the housing, so that the overheat preventing device prevents the sheath heater from overheating.
10. The cooling water heating apparatus of claim 1, wherein an upper surface of the overheat preventing device and an upper surface of the sheath heater are disposed below an upper surface of the housing in the gravity direction, and
 an amount of heat generated from the sheath heater varies in accordance with a water level of the cooling water in the housing, so that the overheat preventing device prevents the sheath heater from overheating.

* * * * *